(12) United States Patent
Tong et al.

(10) Patent No.: US 10,762,657 B2
(45) Date of Patent: Sep. 1, 2020

(54) MESH DENOISING

(71) Applicant: MICROSOFT TECHNOLOGY LICENSING, LLC, Redmond, WA (US)

(72) Inventors: Xin Tong, Beijing (CN); Yang Liu, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 111 days.

(21) Appl. No.: 16/096,448

(22) PCT Filed: Mar. 28, 2017

(86) PCT No.: PCT/CN2017/078352
§ 371 (c)(1),
(2) Date: Oct. 25, 2018

(87) PCT Pub. No.: WO2017/185937
PCT Pub. Date: Nov. 2, 2017

(65) Prior Publication Data
US 2019/0139248 A1    May 9, 2019

(30) Foreign Application Priority Data
Apr. 29, 2016    (CN) .......................... 2016 1 0285481

(51) Int. Cl.
*G06K 9/00*     (2006.01)
*G06T 7/60*     (2017.01)
(Continued)

(52) U.S. Cl.
CPC ............. *G06T 7/60* (2013.01); *G06N 5/003* (2013.01); *G06N 7/005* (2013.01); *G06N 20/00* (2019.01);
(Continued)

(58) Field of Classification Search
CPC combination set(s) only.
See application file for complete search history.

(56) References Cited

U.S. PATENT DOCUMENTS

| 8,698,800 B2 * | 4/2014 | Xie | .......................... G06T 17/20 |
| | | | 345/423 |
| 2004/0075659 A1 * | 4/2004 | Taubin | .................... G06T 17/20 |
| | | | 345/428 |

(Continued)

FOREIGN PATENT DOCUMENTS

| CN | 104952107 A | 9/2015 |
| WO | 2014/190037 A1 | 11/2014 |

OTHER PUBLICATIONS

Dollar, et al., "Cascaded Pose Regression", In IEEE Conference on Computer Vision and Pattern Recognition, Jun. 13, 2010, pp. 1078-1085.

(Continued)

*Primary Examiner* — Jose L Couso
(74) *Attorney, Agent, or Firm* — Merchant & Gould

(57) ABSTRACT

In this disclosure, a solution for denoising a curve mesh is proposed. For a curve mesh including a polygonal facet, a noisy normal and a ground-truth normal of a first facet in the mesh is obtained. Then, based on the noisy normal, a first geometric feature of the first facet is determined from a plurality of neighboring facets of the first facet in the mesh. Next, based on the first geometric feature and the ground-truth normal, a mapping from the first geometric feature to the ground-truth normal of the first facet is determined for denoising the mesh.

20 Claims, 4 Drawing Sheets

(51) Int. Cl.
| | |
|---|---|
| G06T 5/00 | (2006.01) |
| G06N 5/00 | (2006.01) |
| G06N 20/00 | (2019.01) |
| G06T 17/20 | (2006.01) |
| G06N 20/10 | (2019.01) |
| G06N 7/00 | (2006.01) |
| G06T 5/20 | (2006.01) |

(52) U.S. Cl.
CPC ............. *G06N 20/10* (2019.01); *G06T 5/002* (2013.01); *G06T 5/20* (2013.01); *G06T 17/20* (2013.01); *G06T 17/205* (2013.01); *G06T 2207/10028* (2013.01)

(56) References Cited

U.S. PATENT DOCUMENTS

| | | | | |
|---|---|---|---|---|
| 2005/0265629 | A1 | 12/2005 | Fu et al. | |
| 2006/0028466 | A1* | 2/2006 | Zhou ................. | G06T 17/20 345/420 |
| 2014/0126808 | A1* | 5/2014 | Geisler ............... | G06T 5/002 382/159 |
| 2015/0109290 | A1* | 4/2015 | Chang ................ | G06T 17/00 345/420 |
| 2015/0215590 | A1 | 7/2015 | Nowozin et al. | |
| 2015/0221131 | A1* | 8/2015 | Luo .................... | G06T 17/20 345/419 |
| 2017/0004627 | A1* | 1/2017 | Baloch ............... | G06T 17/20 |
| 2017/0069059 | A1* | 3/2017 | Urfalioglu .......... | G06T 5/002 |
| 2017/0178390 | A1* | 6/2017 | Ye ...................... | G06T 7/521 |
| 2018/0165821 | A1* | 6/2018 | Nezamabadi ...... | G06T 15/08 |

OTHER PUBLICATIONS

Adams, et al., "Fast High-Dimensional Filtering Using the Permutohedral Lattice", In Journal Computer Graphics Forum vol. 29—Issue 2, May 3, 2010, 10 Pages.
Agostinelli, et al., "Adaptive Multi-Column Deep Neural Networks with Application to Robust Image Denoising", In Proceedings of Advances in Neural Information Processing Systems, Dec. 2013, 9 Pages.
Andres, et al., "Non-Parametric Blur Map Regression for Depth of Field Extension", In Proceedings of the IEEE Transactions on Image Processing, vol. 25, Issue 4, Feb. 8, 2016, pp. 1660-1673.
Bajaj, "Anisotropic Diffusion of Surfaces and Functions on Surfaces", In Journal ACM Transactions on Graphics, vol. 22, No. 1, Jan. 2003, 29 Pages.
Botsch, "Polygon Mesh Processing", In Publication of CRC Press, Oct. 7, 2010, 243 Pages.
Burger, et al., "Image Denoising: Can Plain Neural Networks Compete with BM3D?", In IEEE Conference on Computer Vision and Pattern Recognition, Jun. 16, 2016, 8 Pages.
Cao, "Displaced Dynamic Expression Regression for Real-Time Facial Tracking and Animation", In Journal ACM Transactions on Graphics, vol. 33, Issue 4, Jul. 2014, 10 Pages.
Chen, "Joint Cascade Face Detection and Alignment", In Proceedings of European Conference on Computer Vision, Sep. 6, 2014, 14 Pages.
Clarenz, "Anisotropic Geometric Diffusion in Surface Processing", In Proceedings of the Conference on Visualization, Oct. 8, 2000, 9 Pages.
Desbrun, et al., "Implicit Fairing of Irregular Meshes Using Diffusion and Curvature Flow", In Proceedings of the 26th Annual Conference on Computer Graphics and Interactive Techniques, Aug. 8, 1999, 8 Pages.
Deschaud, et al., "Point Cloud Non Local Denoising Using Local Surface Descriptor Similarity", In Proceedings of the Symposium PCV (Photogrammetric Computer Vision and Image Analysis), XXXVIII, Part 3A, Sep. 1, 2010, pp. 109-114.

Digne, Julie, "Similarity based Filtering of Point Cloud", In Proceedings of the IEEE Computer Society Conference on Computer Vision and Pattern Recognition Workshops, Jun. 16, 2012, 7 Pages.
Fan, "Robust Feature-Preserving Mesh Denoising Based on Consistent Subneighborhoods", In Journal IEEE Transactions on Visualization and Computer Graphics, vol. 16, Issue 2, 13 Pages.
Fanello, "Filter Forests for Learning Data-Dependent Convolutional Kernels", In IEEE Conference on Computer Vision and Pattern Recognition, 8 Pages.
Fleishman, "Bilateral Mesh Denoising", In Journal ACM Transactions on Graphics, vol. 22, Issue 3, Jul. 2003, 4 Pages.
He, et al., "Mesh Denoising via L0 Minimization", In Journal ACM Transactions on Graphics, vol. 32, Issue 4, Jul. 2013, 8 Pages.
Hildebrandt, "Anisotropic Filtering of Non-Linear Surface Features", In Journal Computer Graphics Forum, vol. 23, Issue 3, Aug. 27, 2004, 10 Pages.
Huang, et al., "Extreme Learning Machines: A Survey", In International Journal of Machine Learning and Cybernetics, vol. 2, Issue 2, Jun. 2011, 16 Pages.
Johnson, et al., "Using Spin Images for Efficient Object Recognition in Cluttered 3D Scenes", In Journal of IEEE Transactions on Pattern Analysis and Machine Intelligence, vol. 21, Issue 5, May 1999, 17 Pages.
Jones, et al., "Non-Iterative, Feature-Preserving Mesh Smoothing", In Journal of ACM Transactions on Graphics, vol. 22, Issue 3, Jul. 2003, 7 Pages.
Kalantari, "A Machine Learning Approach for Filtering Monte Carlo Noise", In Journal of ACM Transactions on Graphics, vol. 34, Issue 4, Aug. 2015, 12 Pages.
Kopf, et al., "Joint Bilateral Upsampling", In Journal of ACM Transactions on Graphics, vol. 26, Issue 3, Jul. 2007, 5 Pages.
Lee, et al., "Face Alignment using Cascade Gaussian Process Regression Trees", In Proceedings of IEEE Conference on Computer Vision and Pattern Recognition, Jun. 7, 2015, 9 Pages.
Lee, "Feature-Preserving Mesh Denoising via Bilateral Normal Filtering", In Proceedings of Ninth International Conference on Computer Aided Design and Computer Graphics, Dec. 7, 2005, 6 Pages.
Liu, et al., "Non-Iterative Approach for Global Mesh Optimization", In Journal of Computer-Aided Design, vol. 39, Issue 9, Sep. 2007, 11 Pages.
Lu, "A Robust Scheme for Feature-Preserving Mesh Denoising", In Proceedings of IEEE Transactions on Visualization and Computer Graphics, vol. 22, Issue 3, Sep. 2015, 14 Pages.
Lu, et al., "Ensemble Modeling of Denoising Autoencoder for Speech Spectrum Restoration", In Proceedings of 15th Annual Conference of the International Speech Communication Association, Sep. 14, 2014, pp. 885-889.
Maes, "Feature Detection on 3D Face Surfaces for Pose Normalisation and Recognition", In Proceedings of Fourth IEEE International Conference on Biometrics: Theory Applications and Systems, Sep. 27, 2010, 6 Pages.
Mahajan, et al., "Image Enhancement using Neural Model Cascading using PCNN", In International Journal of Scientific Research Engineering & Technology, Aug. 30, 2014, pp. 143-148.
Mallick, et al., "Characterizations of noise in Kinect Depth Images: A Review", In Journal of IEEE Sensors, vol. 14, Issue 6, Jun. 2014, 10 Pages.
Mittal, et al., "Automatic Noise Identification Using GLCM Properties", In International Journal of Advanced Research in Computer Science and Software Engineering, vol. 3, Issue 6, Jun. 2013, pp. 943-947.
Moon, "Adaptive Rendering based on Weighted Local Regression", In Journal of ACM Transactions on Graphics, vol. 33, Issue 5, Aug. 2014, 14 Pages.
Nguyen, "Modeling Kinect Sensor Noise for Improved 3D Reconstruction and Tracking", In Proceedings of the Second International Conference on 3D Imaging, Modeling, Processing, Visualization & Transmission, Oct. 13, 2012, 7 Pages.
Schelten, "Interleaved Regression Tree Field Cascades for Blind Image Deconvolution", In Proceedings of IEEE Winter Conference on Applications of Computer Vision, Jan. 5, 2015, 8 Pages.

(56) References Cited

OTHER PUBLICATIONS

Shen, "Fuzzy Vector Median-Based Surface Smoothing", In Journal of IEEE Transactions on Visualization and Computer Graphics, vol. 10, Issue 3, May 2004, 14 Pages.
Solomon, "A General Framework for Bilateral and Mean Shift Filtering", In Journal of Computing Research Repository, May 2014, 11 Pages.
Steinke, et al., "Support Vector Machines for 3D Shape Processing", In Journal of Computer Graphics Forum, vol. 24, Issue 3, Sep. 2005, 10 Pages.
Sun, "A Concise and Provably Informative Multi-Scale Signature Based on Heat Diffusion", In Proceedings of the Computer Graphics Forum, vol. 28, Issue 5, Jul. 15, 2009, 10 Pages.
Sun, et al., "Cascaded Hand Pose Regression", In Proceedings of IEEE Conference on Computer Vision and Pattern Recognition, Jun. 7, 2015, 9 Pages.
Sun, "Fast and Effective Feature-Preserving Mesh Denoising", In Journal of IEEE Transactions on Visualization and Computer Graphics, vol. 13, No. 5, Sep. 2007, 14 Pages.
Sun, et al., "Noise Analysis and Synthesis for 3D Laser Depth Scanners", In Journal of Graphical Models, vol. 71, Issue 2, Mar. 2009, 30 Pages.
Tasdizen, et al., "Geometric Surface Smoothing via Anisotropic Diffusion of Normals", In Proceedings of the Conference on Visualization, Oct. 27, 2002, 8 Pages.
Taubin, Gabriel, "A Signal Processing Approach to Fair Surface Design", In Proceedings of the 22nd Annual Conference on Computer Graphics and Interactive Techniques, Sep. 15, 1995, 8 Pages.
Tomasi, et al., "Bilateral Filtering for Gray and Color Images", In Proceedings of Sixth International Conference on Computer Vision, Jan. 4, 1998, 8 Pages.
Unnikrishnan, Ranjith, "Statistical Approaches to Multi-scale Point Cloud Processing", In Technical Report of CMU-RI-TR-08-15, May 2008, 146 Pages.
Wang, et al., "Decoupling Noise and Features via Weighted I1-Analysis Compressed Sensing", In Journal of ACM Transactions on Graphics, vol. 33, Issue 2, Mar. 2014, 12 Pages.
Wang, et al., "Rolling Guidance Normal Filter for Geometric Processing", In Journal of ACM Transactions on Graphics, vol. 34, Issue 6, Nov. 2015, 9 Pages.
Xu, et al., "Deep Edge-Aware Filters", In Proceedings of 32nd International Conference on Machine Learning, Jul. 6, 2015, 10 Pages.
Yagou, et al., "Mesh Denoising via Iterative Alpha-Trimming and Nonlinear Diffusion of Normals with Automatic Thresholding", In Proceedings of Computer Graphics International, Jul. 9, 2003, 8 Pages.
"Search Report Issued in European Patent Application No. 17788590. 2", dated Nov. 6, 2019, 7 Pages.
Alvarez, et al., "A mesh optimization algorithm based on neural networks", Published in Journal Information Sciences,vol. 177, Issue 23, Dec. 1, 2007, pp. 5347-5364.
Diebel, et al., "A Bayesian Method for Probable Surface Reconstruction and Decimation", Published in Journal of ACM Transactions on Graphics (TOG),vol. 25, Issue 1, Jan. 1, 2006, pp. 39-59.
Kalogerakis, et al., "Learning 3D Mesh Segmentation and Labeling", In Journal of ACM Transactions on Graphics, vol. 29, Issue 4, Jul. 26, 2010, 12 Pages.
Schmidt, et al., "Cascades of Regression Tree Fields for Image Restoration", Published in IEEE Transactions on Pattern Analysis and Machine Intelligence, vol. 38, Issue 4, Apr. 1, 2016, pp. 677-689.
Wang, et al., "Mesh Denoising Via Cascaded Normal Regression", Published in ACM Transactions on Graphics, vol. 36, No. 6, Nov. 11, 2016, 12 Pages.
Wei, et al., "Bi-Normal Filtering for Mesh Denoising", Published in IEEE Transactions on Visualization and Computer Graphics, vol. 21, Issue 1, Jan. 1, 2015, pp. 43-55.
Zhang, et al., "Guided Mesh Normal Filtering", Published in Computer Graphics Forum, vol. 34, No. 7, Oct. 1, 2015, pp. 1-12.
Yagou, et al., "Mesh Smoothing via Mean and Median Filtering Applied to Face Normals", In Proceedings of Geometric Modeling and Processing, Jul. 10, 2002, 8 Pages.
Zheng, et al., "Bilateral Normal Filtering for Mesh Denoising", In Journal of IEEE Transactions on Visualization and Computer Graphics, vol. 17, Issue 10, Oct. 2011, pp. 1521-1530.
Zaharescu, et al., ",Surface Feature Detection and Description with Applications to Mesh Matching", In Proceedings of IEEE International Conference on Computer Vision and Pattern Recognition, May 2009, 9 Pages.
Chui, et al., "Deep Network Cascade for Image Super-resolution", "In Proceedings of 13th European Conference on Computer Vision, Part V", Sep. 6, 2014, 16 Pages.
"Office Action Issued in European Patent Application No. 17788590. 2", dated Feb. 12, 2020, 5 Pages.
International Search Report for PCT/CN2017/078352, dated Jul. 4, 2017.

\* cited by examiner

MESH DENOISING

CROSS-REFERENCE TO RELATED APPLICATION

This application is a U.S. National Stage Application of PCT/CN2017/078352, filed Mar. 28, 2017, which claims benefit of Chinese Patent Application No. 201610285481.4, filed Apr. 29, 2016, which applications are hereby incorporated by reference. To the extent appropriate, a claim of priority is made to each of the above disclosed applications.

BACKGROUND

The prevalence of three-dimensional (3D) scanners and depth cameras greatly simplifies geometric modelling procedures, and enables people to easily obtain a 3D shape from the real world. Different from a 3D mesh manually created by artists, noise in a scanned 3D mesh is always very significant. The "noise" here refers to random signal interference suffered by the 3D mesh when being scanned or photographed. Various factors can introduce such noises, e.g., limited device precision, material attributes of a real world object, errors in a reconstruction process, and so on. As such, removing noises from the scanned 3D mesh becomes an essential task in 3D geometric processing.

SUMMARY

In accordance with implementations of the subject matter described herein, a data-driven solution for denoising a mesh is proposed. For a mesh including a facet, a noisy normal and a ground-truth normal of a first facet in the mesh is obtained. Then, based on the noisy normal, a first geometric feature of the first facet is determined from a plurality of neighboring facets of the first facet in the mesh. Next, based on the first geometric feature and the ground-truth normal, a mapping from the first geometric feature to the ground-truth normal of the first facet is determined for denoising the mesh.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols are used to indicate the same or similar elements.

DETAILED DESCRIPTION

Figure 1:
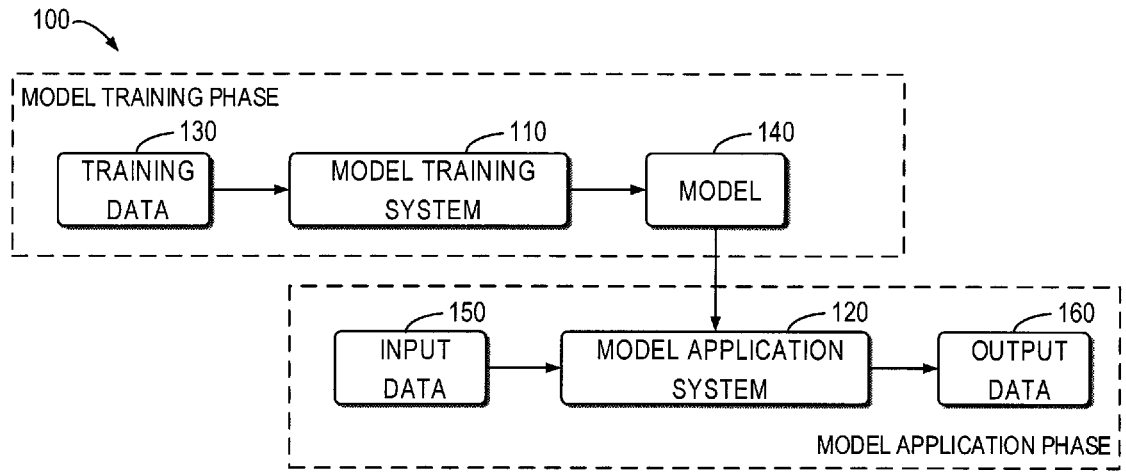
FIG. 1 illustrates a block diagram of an environment 100 where implementations of the subject matter as described herein can be implemented.

The subject matter described herein will now be discussed with reference to several example implementations. It is to be understood these implementations are discussed only for enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," "third" and the like may refer to different or same elements. Other definitions, explicit and implicit, can be included below. A definition of a term is consistent throughout the description unless the context clearly indicates otherwise.

In addition, the term "mesh" refers to a representation of a 3D geometric model. Point sampling may be performed on an object in a 3D coordinate system. These sample points may be connected in a certain order into a series of small planes (triangle, or coplanar quadrangle or pentagon). These small planes are also referred to as facets. In this way, the sampled object may be composed of a number of facets, like a mesh, and is thus referred to as a mesh. In the context of the present disclosure, the principle and idea of implementations of the subject matter described herein are mainly illustrated in conjunction with a mesh. Besides the mesh, the 3D geometric model may also be represented by point cloud. The point cloud is a geometric model with discrete sampling points as primitives. Any currently known or future developed methods may be utilized to reconstruct the point cloud into a mesh. For example, a plurality of neighboring sampling points in the point cloud may be used to construct a small plane (like a facet in the mesh). Therefore, implementations of the subject matter described herein are also suitable for the point cloud.

As described above, it is an essential task in geometric processing to remove noises from a scanned mesh. A fundamental object of mesh denoising is to recover its ground-truth surface from a noisy surface of the object. The existing denoising algorithms are filter-based approaches. For example, a specific filter such as a bilateral filter may be designed, and "trial and error" may be applied to select parameters for the filter so as to reach a satisfactory denoising effect. However, the whole process may be cumbersome. Besides, the existing denoising algorithms usually assume statistical characteristics of the noise. For example, they may assume that the noise is Gaussian-like distributed, which may be not necessarily true in real data. For a noise originated from many factors (such as the scanning device, the scanning environment, and material of the object, etc.), the characteristics of the noise may be complex. Therefore, the existing denoising algorithms that assume statistical characteristics of the noise cannot effectively remove the noise.

In order to solve the problems above and one or more of other potential problems, a solution of mesh denoising is provided in accordance with example implementations of the subject matter described herein. As described above, the mesh may be composed of a number of facets. Each of the facets may have a straight line (also referred to as a normal line) vertical to the facet. The direction of the straight line may be referred to as "normal." Therefore, the procedure of mesh denoising may comprise recovering corresponding ground-truth normals from noisy normals of a series of facets in a mesh, and updating vertex positions of the mesh based on these ground-truth normals.

FIG. 1 illustrates a block diagram of an environment 100 where implementations of the subject matter described herein may be implemented. It is to be understood that the structure and functionality of the environment 100 are described only for the purpose of illustration without suggesting any limitations as to the scope of the subject matter described herein. The subject matter described herein can be embodied with a different structure and/or functionality.

As illustrated in FIG. 1, the environment 100 may generally comprise a model training system 110 and a model application system 120. In accordance with implementations of the subject matter described herein, the solution for mesh denoising may comprise two phases: model training phase and model application phase.

During the model training phase, the model training system 110 may be configured to receive training data 130 and generate a model 140 based on the training data 130. The training data 130 may be a dataset including noisy normals and corresponding ground-truth normals of a series of facets in the mesh. The model 140 for mesh denoising may be generated by the model training system 110 based on the training data 130. The model 140 may represent a mapping from a noisy normal to a ground-truth normal of a facet.

During the model application phase, the model application system 120 may be configured to receive the model 140 and input data 150, and generate the output data 160 based on the model 140 and the input data 150. The input data 150 may indicate a group of noisy normals of the mesh. The model application system 120 may map, by using the model 140, the group of noisy normals to a corresponding group of ground-truth normals, i.e., the output data 160. Based on the output data 160, vertex positions of the mesh may be updated, thereby implementing the mesh denoising.

Figure 2:
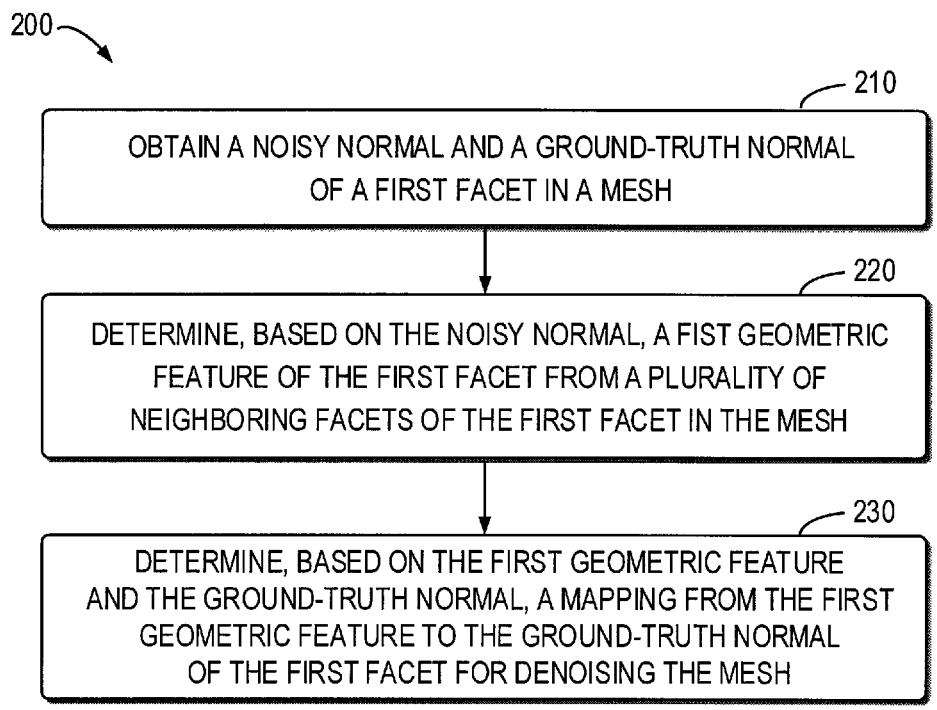
FIG. 2 illustrates a flowchart of a method 200 for mesh denoising in accordance with implementations of the subject matter described herein.

FIG. 2 illustrates a flowchart of a method 200 for mesh denoising in accordance with implementations of the subject matter described herein. For example, the method 200 may be executed by the model training system 110 as illustrated in FIG. 1. It should be understood that the method 200 may also comprise additional steps (not shown) and/or may omit the illustrated steps. The scope of the subject matter described herein is not limited in this aspect.

The method 200 starts from step 210. In step 210, the model training system 110 obtains noisy normals and ground-truth normals of one or more facets in a mesh. At the ease of depiction, the facet processed here is referred to as "a first facet." The noisy normal and ground-truth normal of the first facet may form the training data 130 as illustrated in FIG. 1. For example, the training data 130 may be obtained based on user input or by the way of data synthesis. In addition, the training data 130 may also be obtained from any currently known or future developed devices. For example, a scanning device with a relatively low precision may be used to obtain the noisy normal of the first facet, while a scanning device with a relatively high precision may be used to obtain the ground-truth normal of the first facet. The scope of the subject matter described here is not limited in this aspect.

Next, the method 200 proceeds to step 220. In step 220, the model training system 110 determines a first geometric feature of the first facet from a plurality of neighboring facets of the first facet in the mesh. In some implementations, the "neighboring facets" may include a facet that shares a vertex and/or edge with the first facet. In some implementations, the "neighboring facets" may include a facet with a distance from its centroid to the centroid of the first facet being less than a predetermined threshold. In addition, in some implementations, the "neighboring facets" may include all facets in the mesh. In some implementations, normal changes and position changes between the first facet and a plurality of neighboring facets may be filtered to generate a feature vector representing the first geometric feature. For example, a plurality of neighboring facets may be selected based on the impact range of the filtering parameters.

Taking a 3D triangular mesh (i.e., each facet in the mesh is a triangular facet) as an example, the mesh may be represented as M=(V, F), where V={$v_i$} may represent a set of vertices and F={$f_i$} may represent a set of facets. The centroid of facet $f_i$ may be represented as $c_i$, and the normal of the facet $f_i$ may be represented as $n_i$.

In some implementations, bilateral filtering may be performed on the normal changes and the position changes between the first facet and the plurality of neighboring facets to generate a feature vector representing the first geometric feature. For example, the (k+1)-th iteration of the bilateral filter may be defined as follows:

$$n_i^{k+1} = \frac{1}{K_i} \sum_{f_j \in F} (A_j W_s(\|c_i - c_j\|) W_r(\|n_i^k - n_j^k\|) \cdot n_j) \tag{1}$$

where $n_j$ represents an initial noisy normal of facet $f_j$. $n_i^k$ represents a filtered normal of the facet $f_i$ that has been subjected to k times of iterations; when k=0, $n_i^k$ represents the initial noisy normal of the facet $f_i$. $A_j$ represents an area of the facet $f_j$. In equation (1) (and all of the following equations), the operator "·" represents a product. $W_s$ and $W_r$ are monotonically decreasing weighting functions characterizing the positional similarity and the normal similarity between a pair of facets, respectively. For example, a Gaussian function $W_{94}(x)=\exp(-x^2/(2\sigma^2))$ may be used, then the standard deviations of $W_s$ and $W_r$ are $\sigma_s$ and $\sigma_r$, respectively.

$$K_i = \sum_{f_j \in F} A_j W_s(\|c_i - c_j\|) W_r(\|n_i^k - n_j^k\|)$$

is a normalization item. When $\sigma_s$, $\sigma_r$, and iteration times are properly set, effective filtering of noises on the normals can be carried out while preserving the sharp features of the mesh. The equation (1) may be represented as $B_{\sigma_s,\sigma_r}(n_i)$ so as to bind the parameters $\sigma_s$ and $\sigma_r$, thereby obtaining a feature vector $S_i$ on the facet $f_i$. In other words, $S_i$ may be represented using the following equation (2):

$$S_i = \left(B^1_{\sigma_{s_1},\sigma_{r_1}}(n_i), \ldots, B^1_{\sigma_{s_l},\sigma_{r_l}}(n_i), B^2_{\sigma_{s_1},\sigma_{r_1}}(n_i), \ldots, \right.$$
$$\left. B^2_{\sigma_{s_l},\sigma_{r_l}}(n_i), \ldots, B^k_{\sigma_{s_1},\sigma_{r_1}}(n_i), \ldots, B^k_{\sigma_{s_l},\sigma_{r_l}}(n_i)\right) \quad (2)$$

where P={$(\sigma_{s_1}, \sigma_{r_1}), \ldots, (\sigma_{s_l}, \sigma_{r_l})$} is a parameter set containing various Gaussian derivations, l denotes a number of parameter pairs (as, ar) contained in the parameter set P. $S_i$ represented with equation (2) may also be referred to as a bilateral filtered normal descriptor (B-FND).

Alternatively, or in addition, in some implementations, in order to handle a higher level of noise, the normal changes and the position changes between the first facet and the plurality of neighboring facets may be guided filtered to generate a feature vector representing the first geometric feature. The guided filter is also referred to as a joint bilateral filter. Because the guide filter introduces a reliable guidance to the bilateral filter, it is more robust to a high-level noise. For example, the guided filter may be defined as below:

$$n_i^{k+1} = \frac{1}{K_i} \sum_{f_j \in F} (A_j W_s(\|c_i - c_j\|) W_r(\|g(n_i^k) - g(n_j^k)\|) \cdot n_j) \quad (3)$$

where $g(\cdot)$ represents a predefined guidance of facet normals. For example, in one implementation, a Gaussian normal filter may be used as the guidance, i.e., $$g(n_i^k) = \frac{1}{\tilde{K}_i} \sum_{f_j \in F} (W_s(\|c_i - c_j\|) \cdot n_j^k),$$

where $$\tilde{K}_i = \left\| \sum_{f_j \in F} A_j W_s(\|c_i - c_j\|) W_r(\|g(n_i^k) - g(n_j^k)\|) \cdot n_j \right\|$$

is a normalization item.

The equation (3) may be represented as $G_{\sigma_s,\sigma_r}(n_i)$ so as to derive the feature vector $S_i$ on the facet $f_i$. That is, $S_i$ may be represented using the following equation (4):

$$S_i = \left(G^1_{\sigma_{s_1},\sigma_{r_1}}(n_i), \ldots, G^1_{\sigma_{s_l},\sigma_{r_l}}(n_i), G^2_{\sigma_{s_1},\sigma_{r_1}}(n_i), \ldots, \right.$$
$$\left. G^2_{\sigma_{s_l},\sigma_{r_l}}(n_i), \ldots, G^k_{\sigma_{s_1},\sigma_{r_1}}(n_i), \ldots, G^k_{\sigma_{s_l},\sigma_{r_l}}(n_i)\right) \quad (4)$$

$S_i$ represented by the equation (4) may also be referred to as a guided filtered normal descriptor (G-FND). For a mesh with large noises, G-FND is more robust than B-FND in distinguishing major features while B-FND is more sensitive to weak features than G-FND.

It should be understood that besides the bilateral filter and guided filter mentioned above, other robust filters may also be utilized to generate a feature vector representing the first geometric vector. The scope of the subject matter described here is not limited in this aspect.

By collecting the normal descriptors of all facets in the mesh, a feature vector set (denoted as Ω) may be obtained. A feature vector $S_i$ in Ω contains a sequence of filtered facet normal. Alternatively, or in addition, further processing may be performed on the feature vectors in Ω. For example, an individual feature vector $S_i$ in Ω may be aligned. It is supposed that that $S_i$ includes d filtered normals: $m_1$, $m_2$, ..., $m_d$, a normal tensor $$T_i = \sum_{j=1}^{d} m_j m_j^T$$

may be constructed. The three eigenvectors of the matrix $T_i$ define a rotation matrix $R_i$ from a local coordinate system where a filtered facet normal in $S_i$ is located to the global coordinate system (i.e., the coordinate system where the mesh is located). By multiplying each $m_j$ with $R_j^{-1}$, the feature vector $S_i$ may be aligned. After all of the feature vectors in Ω are aligned, a principle component analysis (PCA) may be performed to reduce dimensions of the feature vectors. A dimension of a feature vector refers to a number (e.g., d) of the filtered normals included in the feature vector. The number of principal components may be determined by preserving at least 90% of the feature energy, e.g., may be determined to be 3. In addition, a clustering algorithm may also be used to cluster the feature vectors with or without dimensionality reduction.

Next, the method 200 proceeds to step 230. In step 230, the model training system 110 determines, based on the first geometric feature and the ground-truth normal, a mapping from the first geometrical feature to a ground-truth normal of the first facet for denoising the mesh.

In some implementations, the mapping from the first geometric feature to the ground-truth normal of the first facet may be determined by using a regression analysis. The regression analysis is a method of determining a dependency between two or more variables. For example, the regression analysis may build a regression model by specifying a cause-and-effect relationship between the geometric feature and the ground-truth normal of a facet, resolve each of parameters of the model based on training data, and then evaluate whether the regression model can fit the training data well.

Figure 3:
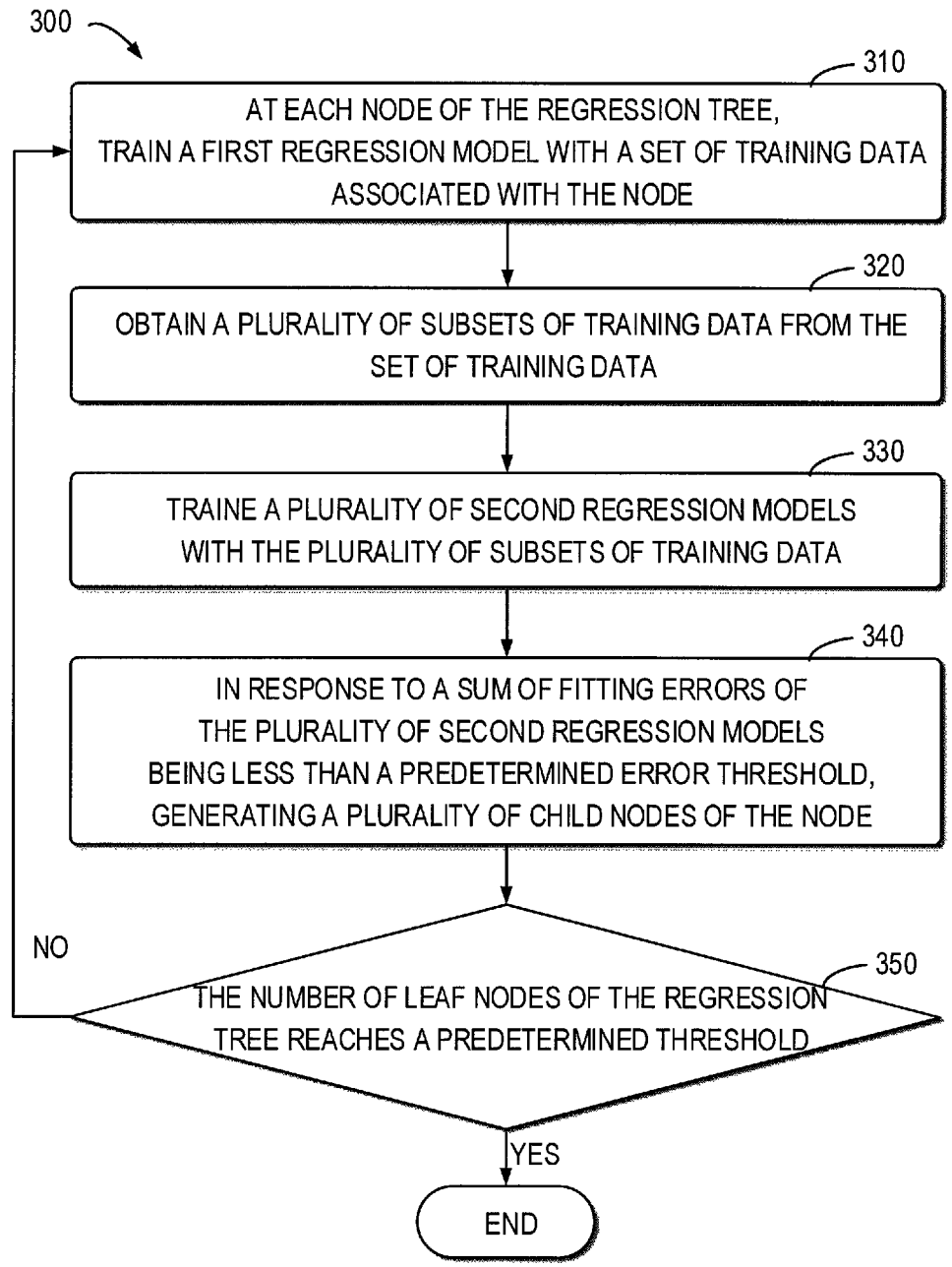
FIG. 3 illustrates a flowchart of a method 300 for generating a regression tree in accordance with implementations of the subject matter described herein.

As an example, in some implementations, the mapping from the first geometric feature to the ground-truth normal of the first facet may be determined by generating a regression tree representing the mapping. In this aspect, FIG. 3 illustrates a flowchart of a method 300 for generating a regression tree in accordance with implementations of the subject matter described herein. The method 300 may be regarded as an implementation of the step 230 in the method 200, and for example, may be executed by the model training system 110 as illustrated in FIG. 1.

In step 310, at each node of the regression tree, a first regression model is trained with a set of training data associated with the node. For example, at the root node of the regression tree, the set of training data may include the first geometric feature and the ground-truth normal of each of the plurality of facets in the mesh. The set of training data at the root node may be represented as X={$S_i, \bar{n}_i$}$_{i=1}^{N}$, where $S_i$ denotes the feature vector of the facet $f_i$, $\bar{n}_i$ denotes the ground-truth normal of the facet $f_i$, {$S_i, \bar{n}_i$} denotes a sample of the set of training data, and N denotes the number of samples in the set of training data.

For example, in some implementations, a single-hidden layer feed forward network (SLFN) model may be selected as a regression model, and the regression model may be trained based on an extreme learning machine (ELM) technology. An essence of ELM lies in that weights of the hidden layer may be randomly generated without tuning. For a set of training data with N samples, the ELM with L hidden nodes may be represented by the following equation (5):

$$\mathcal{F}_\beta(S_i) = \left(\sum_{j=1}^{L} \beta_{j,1}\theta(a_j, b_j, S_i), \sum_{j=1}^{L} \beta_{j,2}\theta(a_j, b_j, S_i), \sum_{j=1}^{L} \beta_{j,3}\theta(a_j, b_j, S_i)\right) \quad (5)$$

where i=1, . . . , N. $\mathcal{F}_\beta(S_i)$ denotes an expected facet normal from the regression, which is a three-dimensional vector. Each weight in the output weight vector $\hat{\beta}=\{\beta_{j,1}, \beta_{j,2}, \beta_{j,3}; j=1, \ldots, L\}$ is associated with one dimension of $\mathcal{F}_\beta(S_i)$. $\theta(a_j, b_j, S_i)$ denotes an activation function of the hidden node. For example, $\theta(a_j, b_j, S_i)$ may be set as a sigmoid function, and represented by the following equation (6):

$$\theta(a_j, b_j, S_i) = \frac{1}{1+\exp(-a_j \cdot S_i - b_j)} \quad (6)$$

where $a_j$ and $b_j$ are hidden node weights randomly selected from intervals $[-1, 1]^M$ and $[0, 1]$ respectively, M denotes the dimension of the vector $S_i$. The output weight vector $\hat{\beta}$ is unknown in ELM, which may be determined by resolving an $L_P$ regularized least square problem. $\hat{\beta}$ may be represented by the following equation (7):

$$\hat{\beta} = \text{argmin} \sum_{i=1}^{N} \left\|\mathcal{F}_\beta(S_i) - \bar{n}_i\right\|_2^p \quad (7)$$

A cost function of the regression may be represented by the following equation (8):

$$E = \sum_{i=1}^{N} \left\|\mathcal{F}_\beta(S_i) - \bar{n}_i\right\|_2^p \quad (8)$$

For example, the norm p in the equations (7) and (8) may be set to 1, thereby reducing a negative effect caused by outliers in the set of training data by optimizing $\|\mathcal{F}_\beta(S_i) - \bar{n}_i\|_2^p$ into an error defined by $L_1$ norm. An iteratively reweighted least squares approach may be employed to find the minimum value of the output weights, which may be expressed as the following equation (9):

$$\beta^{(l+1)} = \text{argmin} \sum_{i=1}^{N} \left(\left\|\mathcal{F}_{\beta^{(l)}}(S_i) - \bar{n}_i\right\|_2^{-1} \cdot \left\|\mathcal{F}_\beta(S_i) - \bar{n}_i\right\|_2^2\right) \quad (9)$$

where l represents the number of iterations. Once the output weights are known, the ELM may predict the noise-free facet normal.

In some implementations, the first regression model may be trained based on the ELM technology at each node of the regression tree. The fitting error of the first regression model, for example, may be computed as $E_0$ according to the equation (8) above.

In step 320, a plurality of subsets of training data are obtained from the set of training data. For example, as mentioned above, the set of training data may be clustered into a plurality of clusters using PCA. Of course, any other appropriate technologies or algorithms may be used in conjunction with the subject matter described here for clustering the set of training data into a plurality of clusters. For example, any currently known or future developed clustering methods may be used.

In step 330, a plurality of second regression models are trained with the plurality of subsets of training data. For example, the plurality of second regression models may be trained for the plurality of subsets of training data based on a neural network technology. The manner of training a second regression model is identical to the manner of training the first regression model as described in step 310, which will not be further detailed here.

Next, the method 300 proceeds to step 340. In step 340, in response to a sum of fitting errors of the plurality of second regression models being less than a predetermined error threshold, a plurality of child nodes of the node are generated. For example, if the sum of fitting errors of the plurality of second regression models is less than 2% of $E_0$, the plurality of child nodes of the node may be generated. Each of the child nodes is associated with one subset of training data.

Next, in step 350, it is determined whether the number of leaf nodes (i.e., nodes without child nodes) of the regression tree reaches a predetermined threshold. For example, the predetermined threshold may be set to 8. When the number of leaf nodes of the regression tree is greater than or equal to 8, the regression tree stops growing (i.e., the method 300 ends). When the number of leaf nodes of the regression tree is less than 8, steps 310-350 are iteratively executed, till the number of leaf nodes of the regression tree reaches 8.

It should be understood that besides the SLFN model as described above, other models may also be used as the regression model. The scope of the subject matter described herein is not limited in this aspect.

Figure 4:
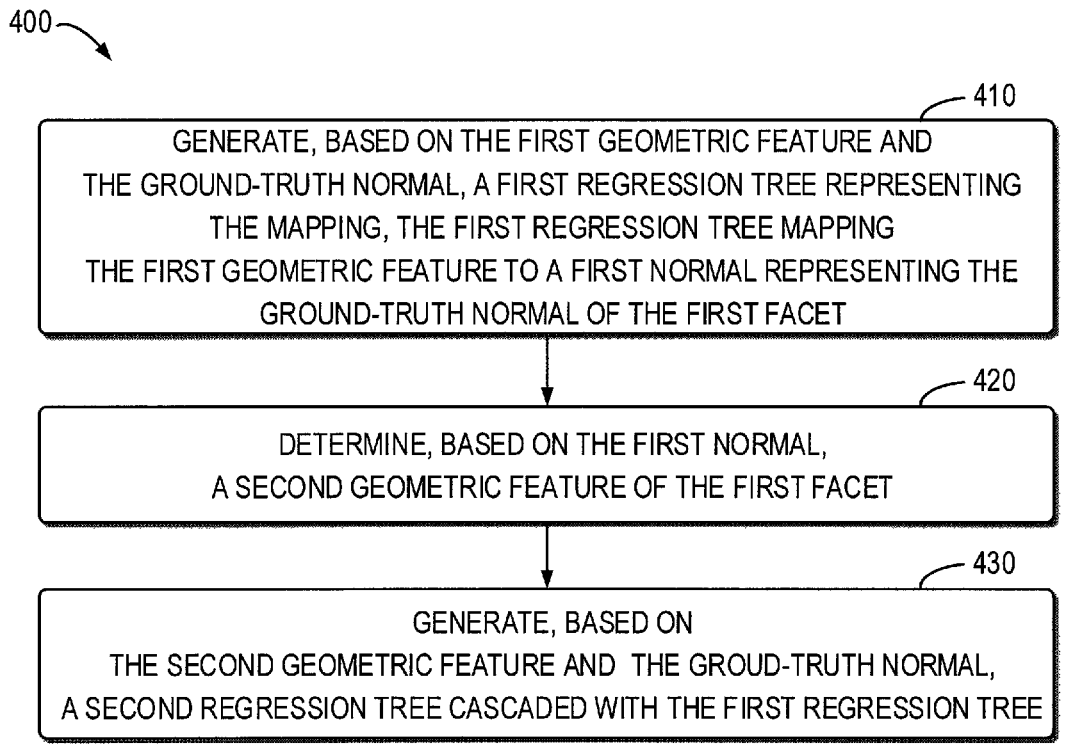
FIG. 4 illustrates a flowchart of a method 400 for generating cascaded regression trees in accordance with implementations of the subject matter described herein.

In some implementations, a mapping from the first geometric feature to the ground-truth normal of the first facet may be determined by generating cascaded regression trees. Cascading of a plurality of regression trees can implement a smaller fitting error (i.e., a lower cost function value). In this aspect, FIG. 4 illustrates a flowchart of a method 400 for generating cascaded regression trees in accordance with implementations of the subject matter described herein. The method 400 may be regarded as an implementation of step 230 in the method 200, and for example, may be executed by the model training system 110 as illustrated in FIG. 1.

In step 410, a first regression tree representing the mapping is generated based on the first geometric feature and the ground-truth normal, the first regression tree mapping the first geometric feature to a first normal representing the ground-truth normal of the first facet. For example, the first regression tree may be generated using the method 300 as described with respect to FIG. 3.

In step 420, a second geometric feature of the first facet is determined based on the first normal. For example, a feature vector representing the second geometric feature of the first facet may be determined in the same manner as step 220 of the method 200 as described with respect to FIG. 2.

Next, the method 400 proceeds to step 430. In step 430, a second regression tree cascaded with the first regression tree is generated. For example, the second regression tree may be generated using the method 300 as described in conjunction with FIG. 3. For example, the second regression tree may map the second geometric feature to the second normal representing the ground-truth normal of the first facet, and the error between the second normal and the ground-truth normal is less than the error between the first normal and the ground-truth normal.

It should be understood that in order to further reduce the fitting error, a third regression tree cascaded with the second regression tree, a fourth regression tree cascaded with the third regression tree, and the like may be further generated. The number of the generated cascaded regression trees, for example, may be determined based on a predetermined fitting error threshold, and the scope of the subject matter as described here is not limited in this aspect. In addition, in order to process a set of training data with a larger error, for example, G-FND may be used to train the first regression tree such that the output of the first regression tree has a smaller error. Then, B-FND may be extracted based on the output of the first regression tree. Because B-FND is more sensitive to sharp features of the mesh, B-FND may be used to train the second regression tree cascaded with the first regression tree.

Therefore, through the methods 200, 300 and/or 400 described above in conjunction with FIGS. 2-4, during the model training phase, the model training system 110 has generated the model 140 (e.g., represented by a single regression tree or multiple cascaded regression trees) based on the training data 130. During the model application phase, the model application system 120 may map the input data 150 representing a group of noisy normals of the mesh to the output 160 representing a corresponding group of ground-truth normals by using the model 140.

Figure 5:
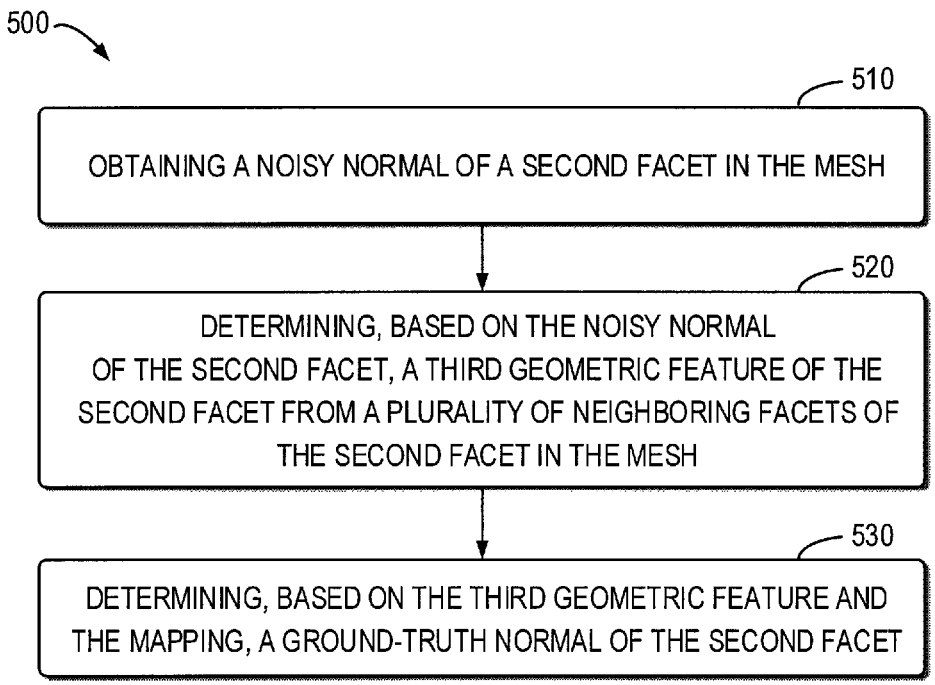
FIG. 5 illustrates a flowchart of a method 400 for mesh denoising in accordance with implementations of the subject matter described herein.

FIG. 5 illustrates a flowchart of a method 500 for mesh denoising in accordance with implementations of the subject matter described herein. For example, the method 500 may be executed by the model application system 120 as shown in FIG. 1. It should be understood that the method 500 may also include additional steps (not shown) and/or may omit the illustrated steps. The scope of the subject matter described herein is not limited in this aspect.

In step 510, noisy normals of one or more facets in the mesh are obtained by the model application system 120. At the ease of depiction, the facet processed here is referred to as "a second facet." The noisy normal of the second facet may form the input data 150 as shown in FIG. 1.

Next, the method 500 proceeds to step 520. In step 520, a third geometric feature of the second facet is determined from a plurality of neighboring facets of the second facet in the mesh. For example, a feature vector representing the third geometric feature of the second facet may be determined in a same manner as the step 220 of the method 200 described with reference to FIG. 2, which will not be further detailed here.

Then, in step 530, a ground-truth normal of the second facet is determined based on the third geometric feature and the mapping. The ground-truth normal of the second facet may form the output data 160 as illustrated in FIG. 1. As mentioned above, for example, the mapping from a geometric feature to a ground-truth normal of a facet may be represented by a single regression tree. In this example, a path into which the feature vector representing the third geometric feature of the second facet is to be branched may be determined based on an intermediate node (i.e., a node with a child node) of the regression tree. When the feature vector representing the third geometric feature of the second facet reaches a leaf node of the regression tree, the ground-truth normal of the second facet may be determined based on a regression model (i.e., equation (5)) corresponding to the leaf node.

In some implementations, the mapping from the geometric feature to the ground-truth normal of the facet may be represented by a plurality of cascaded regression trees. For example, suppose the mapping from the geometric feature of the facet to the ground-truth normal is represented by the cascaded first and second regression trees. In this example, the method 500 may be firstly executed as mentioned above so as to determine a third normal of the second facet based on the noisy normal of the second facet and the first regression tree. Then, the method 500 may be executed repeatedly to determine the ground-truth normal of the second facet based on the third normal of the second facet and the second regression tree. For example, the third normal of the second facet may be obtained (510). Then, a fourth geometric feature of the second facet may be determined based on the third normal of the second facet (520). Finally, the ground-truth normal of the second facet may be determined based on the fourth geometric feature and the second regression tree (530).

Alternatively, or in addition, after the ground-truth normals of facets in the mesh are obtained, vertex positions of the mesh may be updated using these ground-truth normals. For example, the updated vertex positions may be obtained by resolving a non-linear minimization problem represented by the following equation (10):

$$\text{Minimize}_V \sum_{f_i} \left( \sum_{e_{jk} \in \partial f_i} A_i(V)[\bar{n}_i \cdot (v_j - v_k)]^2 \right) \quad (10)$$

where V denotes a set of vertices, $\{\bar{n}_i\}$ denotes the ground-truth normals of the facets in the mesh, $e_{jk}$ denotes an edge of the facet $f_i$ with vertices $v_j$ and $v_k$, and $A_i(V)$ denotes an area of the facet $f_i$.

Figure 6:
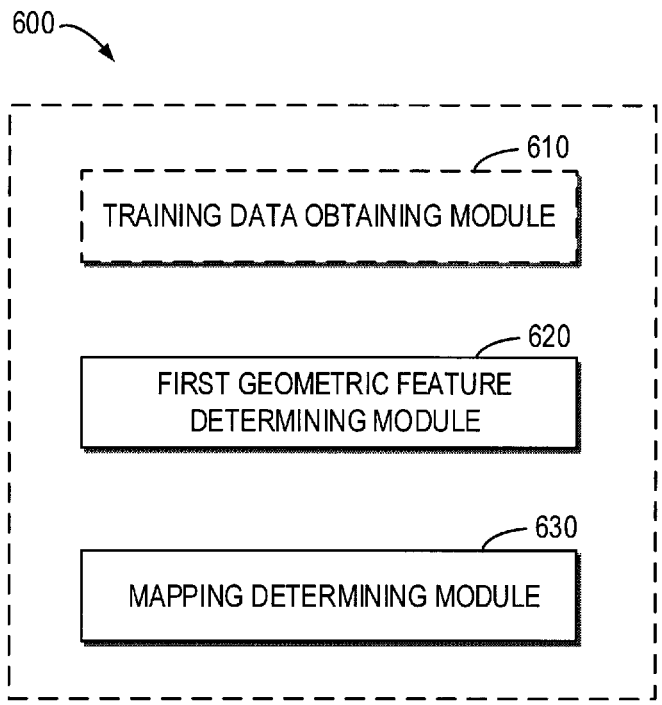
FIG. 6 illustrates a block diagram of an apparatus 600 for mesh denoising in accordance with implementations of the subject matter described herein.

FIG. 6 illustrates a block diagram of an apparatus 600 for mesh denoising in accordance with implementations of the subject matter described herein. The model training system 110, model application system 120 or both may be implemented by the apparatus 600. As illustrated in FIG. 6, the apparatus 600 may comprise a training data obtaining module 610 configured to obtain a noisy normal and a ground-truth normal of a first facet in a mesh. The apparatus 600 may also comprise a first geometric feature determining module 620 configured to determine, based on the noisy normal, a first geometric feature of the first facet from a plurality of neighboring facets of the first facet in the mesh. In addition, the apparatus 600 may also comprise a mapping determining module 630 configured to determine, based on the first geometric feature and the ground-truth normal, a mapping from the first geometric feature to the ground-truth normal of the first facet for denoising the mesh.

Alternatively, or in addition, the apparatus 600 may also comprise an input data obtaining module configured to obtain a noisy normal of a second facet in the mesh. The apparatus 600 may also comprise a third geometric feature determining module configured to determine, based on the noisy normal of the second facet, a third geometric feature of the second facet from a plurality of neighboring facets of the second facet in the mesh. In addition, the apparatus 600 may also comprise an output data determining module configured to determine a ground-truth normal of the second facet based on the third geometric feature and the mapping.

For the sake of clarity, FIG. 6 does not illustrate some optional modules of the apparatus 600. However, it should be understood that various features as described with reference to FIGS. 1-5 are likewise applicable to the apparatus 600. Moreover, respective modules of the apparatus 600 may be hardware modules or software modules. For example, in some embodiment, the apparatus 600 may be implemented partially or completely by software and/or firmware, e.g., implemented as a computer program product embodied on the computer-readable medium. Alternatively, or in addition, the apparatus 600 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 7:
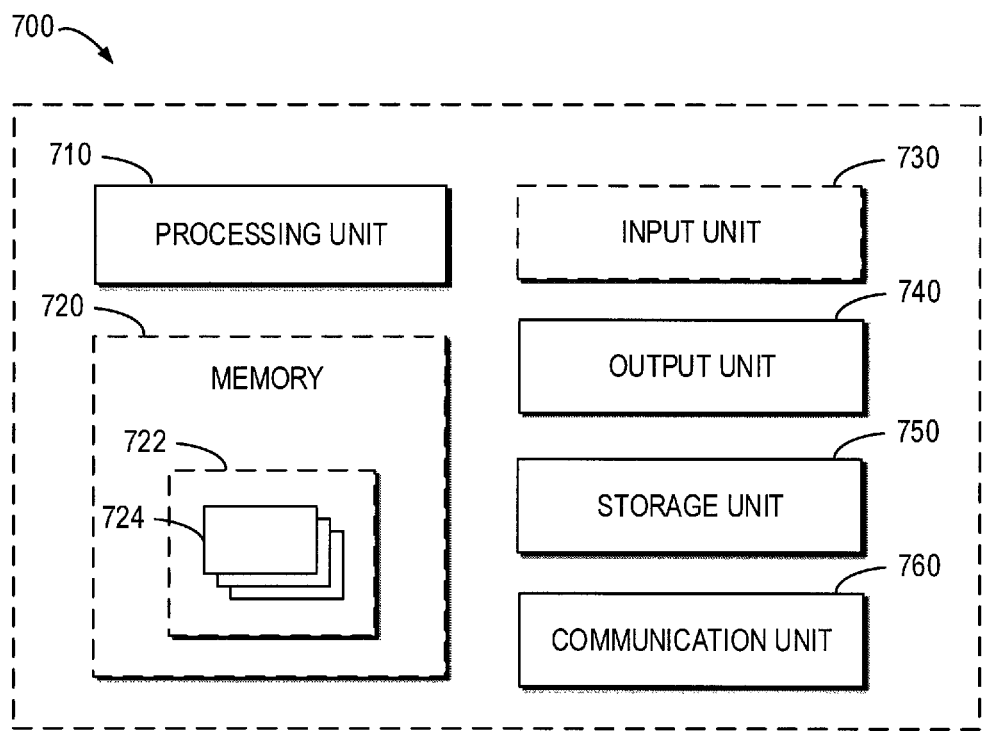
FIG. 7 illustrates a block diagram of an exemplary computing system/server 700 in which one or more implementations of the subject matter described herein may be implemented.

FIG. 7 shows a block diagram of an example computing system/server 700 in which one or more implementations of the subject matter described herein may be implemented. The model training system 110, the model application system 120 or both may be implemented by the computing system/server 700. The computing system/server 700 as shown in FIG. 7 is only an example, which should not be constructed as any limitation to the function and scope of use of the implementations of the subject matter described herein.

As shown in FIG. 7, the computing system/server 700 is in a form of a general-purpose computing device. Components of the computing system/server 700 may include, but are not limited to, one or more processors or processing units 710, a memory 720, one or more input devices 730, one or more output devices 740, storage 750, and one or more communication units 760. The processing unit 710 may be a real or a virtual processor and is capable of performing various processes in accordance with a program stored in the memory 720. In a multi-processing system, multiple processing units execute computer-executable instructions to increase processing power.

The computing system/server 700 typically includes a variety of machine readable medium. Such medium may be any available medium that is accessible by the computing system/server 700, including volatile and non-volatile medium, removable and non-removable medium. The memory 720 may be volatile memory (e.g., registers, cache, a random-access memory (RAM)), non-volatile memory (e.g., a read only memory (ROM), an electrically erasable programmable read only memory (EEPROM), a flash memory), or some combination thereof. The storage 750 may be removable or non-removable, and may include machine readable medium such as flash drives, magnetic disks or any other medium which can be used to store information and which can be accessed within the computing system/server 700.

The computing system/server 700 may further include other removable/non-removable, volatile/non-volatile computing system storage medium. Although not shown in FIG. 7, a disk driver for reading from or writing to a removable, non-volatile disk (e.g., a "floppy disk"), and an optical disk driver for reading from or writing to a removable, non-volatile optical disk can be provided. In these cases, each driver can be connected to the bus 18 by one or more data medium interfaces. The memory 720 may include at least one program product having a set (e.g., at least one) of program modules that are configured to carry out the functions of various implementations of the subject matter described herein.

A program/utility tool 722 having a set (at least one) of the program modules 724 may be stored in, for example, the memory 720. Such program modules 724 include, but are not limited to, an operating system, one or more applications, other program modules, and program data. Each or a certain combination of these examples may include an implementation of a networking environment. The program modules 724 generally carry out the functions and/or methodologies of implementations of the subject matter described herein, for example, the method 200, 300, 400 and/or the method 500.

The input unit(s) 730 may be one or more of various different input devices. For example, the input unit(s) 730 may include a user device such as a mouse, keyboard, trackball, etc. The communication unit(s) 760 enables communication over communication medium to another computing entity. Additionally, functionality of the components of the computing system/server 700 may be implemented in a single computing machine or in multiple computing machines that are able to communicate over communication connections. Thus, the computing system/server 700 may operate in a networked environment using logical connections to one or more other servers, network personal computers (PCs), or another common network node. By way of example, and not limitation, communication media include wired or wireless networking techniques.

The computing system/server 700 may also communicate, as required, with one or more external devices (not shown) such as a storage device, a display device, and the like, one or more devices that enable a user to interact with the computing system/server 700, and/or any device (e.g., network card, a modem, etc.) that enables the computing system/server 700 to communicate with one or more other computing devices. Such communication may be performed via an input/output (I/O) interface(s) (not shown).

Through the above descriptions, it will be understood that implementations of the subject matter described herein do not need to make any assumption to the statistical characteristics of the noise; instead, it learns how to map noisy data to its corresponding ground-truth data from training data comprising the scanned noisy data and its corresponding ground-truth data. Therefore, implementations of the subject matter described herein can be applied to any 3D scanners and can easily remove unknown noises. The feature vectors referred to as the filtered normal descriptors, as proposed in the implementations of the subject matter described herein, are robust to various noises. The process of determining the mapping from the noisy normal to the ground-truth normal by training cascaded regression trees, as proposed in the implementations of the subject matter as described herein, is fast and the generated regression models can effectively remove noises in the data.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are described in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some implementations of the subject matter described herein are listed below.

In a first aspect, an electronic device is provided. The device comprises at least one processing unit and at least one memory coupled to the at least one processing unit and storing instructions for execution by the at least one processing unit, the instructions, when executed by the at least one processing unit, causing the device to: obtain a noisy normal and a ground-truth normal of a first facet in a mesh; determine, based on the noisy normal, a first geometric feature of the first facet from a plurality of neighboring facets of the first facet in the mesh; and determine, based on the first geometric feature and the ground-truth normal, a mapping from a first geometric feature to the ground-truth normal of the first facet for denoising the mesh.

In some implementations, determining the first geometric feature comprises: filtering, by a filter, normal changes and position changes between the first facet and the plurality of neighboring facets so as to generate a feature vector representing the first geometric feature.

In some implementations, the filter comprises a bilateral filter.

In some implementations, the filter comprises a guided filter.

In some implementations, determining the mapping comprises: determining, based on the first geometric feature and the ground-truth normal, the mapping by using regression analysis.

In some implementations, determining the mapping by using the regression analysis comprises: generating, based on the first geometric feature and the ground-truth normal, a first regression tree representing the mapping, the first regression tree mapping the first geometric feature to a first normal representing the ground-truth normal.

In some implementations, generating the first regression tree comprises iteratively executing the following operations at least once, till a number of leaf nodes of the first regression tree reaching a predetermined threshold: at each node of the first regression tree, training a first regression model with a set of training data associated with the node, the set of training data including a first geometric feature and a ground-truth normal of each of a plurality of facets in the mesh; obtaining a plurality of subsets of training data from the set of training data; training a plurality of second regression models with the plurality of subsets of training data; and in response to a sum of fitting errors of the plurality of second regression models being less than a predetermined error threshold, generating a plurality of child nodes of the node.

In some implementations, determining the mapping by using the regression analysis further comprises: determining, based on the first normal, a second geometric feature of the first facet; and generating, based on the second geometric feature and the ground-truth normal, a second regression tree cascaded with the first regression tree, the second regression tree mapping the second geometric feature to the second normal representing the ground-truth normal, and an error between the second normal and the ground-truth normal being less than an error between the first normal and the ground-truth normal.

In some implementations, the instructions, when executed by the at least one processing unit, further causing the device to: obtain a noisy normal of a second facet in the mesh; determine, based on the noisy normal of the second facet, a third geometric feature of the second facet from a plurality of neighboring facets of the second facet in the mesh; and determine, based on the third geometric feature and the mapping, a ground-truth normal of the second facet.

In a second aspect, a method for denoising a mesh including a facet is provided. The method comprises: obtaining a noisy normal and a ground-truth normal of a first facet in a mesh; determining, based on the noisy normal, a first geometric feature of the first facet from a plurality of neighboring facets of the first facet in the mesh; and determining, based on the first geometric feature and the ground-truth normal, a mapping from the first geometric feature to the ground-truth normal of the first facet for denoising the mesh.

In some implementations, determining the first geometric feature comprises: filtering normal changes and position changes between the first facet and the plurality of neighboring facets so as to generate a feature vector representing the first geometric feature.

In some implementations, the filtering comprises: performing bilateral filtering on the normal changes and the position changes between the first facet and the plurality of neighboring facets.

In some implementations, the filtering comprises: performing guided filtering on the normal changes and the position changes between the first facet and the plurality of neighboring facets.

In some implementations, determining the mapping comprises: determining, based on the first geometric feature and the ground-truth normal, the mapping by using regression analysis.

In some implementations, determining the mapping by using the regression analysis comprises: generating, based on the first geometric feature and the ground-truth normal, a first regression tree representing the mapping, the first regression tree mapping the first geometric feature to a first normal representing the ground-truth normal.

In some implementations, generating the first regression tree comprises iteratively executing the following operations at least once, till a number of leaf nodes of the first regression tree reaching a predetermined threshold: at each node of the first regression tree, training a first regression model with a set of training data associated with the node, the set of training data including a first geometric feature and a ground-truth normal of each of a plurality of facets in the mesh; obtaining a plurality of subsets of training data from the set of training data; training a plurality of second regression models with the plurality of subsets of training data; and in response to a sum of fitting errors of the plurality of second regression models being less than a predetermined error threshold, generating a plurality of child nodes of the node.

In some implementations, determining the mapping by using the regression analysis further comprises: determining, based on the first normal, a second geometric feature of the first facet; and generating, based on the second geometric feature and the ground-truth normal, a second regression tree cascaded with the first regression tree, the second regression tree mapping the second geometric feature to the second normal representing the ground-truth normal, and an error between the second normal and the ground-truth normal being less than an error between the first normal and the ground-truth normal.

In some implementations, the method further comprises: obtaining a noisy normal of a second facet in the mesh; determining, based on the noisy normal of the second facet, a third geometric feature of the second facet from a plurality of neighboring facets of the second facet in the mesh; and determining, based on the third geometric feature and the mapping, a ground-truth normal of the second facet.

In a third aspect, a computer program product is provided. The computer program product is tangibly stored on a non-transient machine-readable medium and comprises machine-executable instructions, the instructions, when executed on a device, causing the device to perform steps of the method according to the first aspect.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. An electrical device comprising:
   at least one processor; and
   at least one memory coupled to the at least one processor and storing instructions for execution by the at least one processor, the instructions, when executed by the at least one processor, causing the device to:
      obtain a noisy normal and a ground-truth normal of a first facet in a mesh;
      determine, based on the noisy normal, a first geometric feature of the first facet from a plurality of neighboring facets of the first facet in the mesh; and
      determine, based on the first geometric feature and the ground-truth normal, a mapping from the first geometric feature to the ground-truth normal of the first facet for denoising the mesh.

2. The device of claim 1, wherein determining the first geometric feature comprises:
   filtering, by a filter, normal changes and position changes between the first facet and the plurality of neighboring facets so as to generate a feature vector representing the first geometric feature.

3. The device of claim 2, wherein the filter comprises a bilateral filter.

4. The device of claim 2, wherein the filter comprises a guided filter.

5. The device of claim 1, wherein determining the mapping comprises:
   determining, based on the first geometric feature and the ground-truth normal, the mapping by using regression analysis.

6. The device of claim 5, wherein determining the mapping by using the regression analysis comprises:
   generating, based on the first geometric feature and the ground-truth normal, a first regression tree representing the mapping, the first regression tree mapping the first geometric feature to a first normal representing the ground-truth normal.

7. The device of claim 6, wherein generating the first regression tree comprises:
   iteratively executing the following operations at least once, till a number of leaf nodes of the first regression tree reaching a predetermined threshold:
      at each node of the first regression tree, training a first regression model with a set of training data associated with the node, the set of training data including a first geometric feature and a ground-truth normal of each of a plurality of facets in the mesh;
      obtaining a plurality of subsets of training data from the set of training data;
      training a plurality of second regression models with the plurality of subsets of training data; and
      in response to a sum of fitting errors of the plurality of second regression models being less than a predetermined error threshold, generating a plurality of child nodes of the node.

8. The device of claim 5, wherein determining the mapping by using the regression analysis further comprises:
   determining, based on the first normal, a second geometric feature of the first facet; and
   generating, based on the second geometric feature and the ground-truth normal, a second regression tree cascaded with the first regression tree, the second regression tree mapping the second geometric feature to the second normal representing the ground-truth normal, and an error between the second normal and the ground-truth normal being less than an error between the first normal and the ground-truth normal.

9. The device of claim 1, wherein the instructions, when executed by the at least one processor, further causing the device to:
   obtain a noisy normal of a second facet in the mesh;
   determine, based on the noisy normal of the second facet, a third geometric feature of the second facet from a plurality of neighboring facets of the second facet in the mesh; and
   determine, based on the third geometric feature and the mapping, a ground-truth normal of the second facet.

10. A method for denoising a mesh including a facet, comprising:

obtaining a noisy normal and a ground-truth normal of a first facet in a mesh;

determining, based on the noisy normal, a first geometric feature of the first facet from a plurality of neighboring facets of the first facet in the mesh; and determining, based on the first geometric feature and the ground-truth normal, a mapping from the first geometric feature to the ground-truth normal of the first facet for denoising the mesh.

11. The method of claim 10, wherein determining the first geometric feature comprises:

filtering normal changes and position changes between the first facet and the plurality of neighboring facets so as to generate a feature vector representing the first geometric feature.

12. The method of claim 11, wherein the filtering comprises:

performing bilateral filtering on the normal changes and the position changes between the first facet and the plurality of neighboring facets.

13. The method of claim 10, wherein the filtering comprises:

performing guided filtering on the normal changes and the position changes between the first facet and the plurality of neighboring facets.

14. The method of claim 10, wherein determining the mapping comprises:

determining, based on the first geometric feature and the ground-truth normal, the mapping by using regression analysis.

15. The method of claim 14, wherein determining the mapping by using the regression analysis comprises:

generating, based on the first geometric feature and the ground-truth normal, a first regression tree representing the mapping, the first regression tree mapping the first geometric feature to a first normal representing the ground-truth normal.

16. The method of claim 15, wherein generating the first regression tree comprises:

iteratively executing the following operations at least once, till a number of leaf nodes of the first regression tree reaching a predetermined threshold:

at each node of the first regression tree, training a first regression model with a set of training data associated with the node, the set of training data including a first geometric feature and a ground-truth normal of each of a plurality of facets in the mesh;

obtaining a plurality of subsets of training data from the set of training data;

training a plurality of second regression models with the plurality of subsets of training data; and in response to a sum of fitting errors of the plurality of second regression models being less than a predetermined error threshold, generating a plurality of child nodes of the node.

17. The method of claim 15, wherein determining the mapping by using the regression analysis further comprises:

determining, based on the first normal, a second geometric feature of the first facet; and generating, based on the second geometric feature and the ground-truth normal, a second regression tree cascaded with the first regression tree, the second regression tree mapping the second geometric feature to the second normal representing the ground-truth normal, and an error between the second normal and the ground-truth normal being less than an error between the first normal and the ground-truth normal.

18. The method of claim 10, further comprising:

obtaining a noisy normal of a second facet in the mesh;

determining, based on the noisy normal of the second facet, a third geometric feature of the second facet from a plurality of neighboring facets of the second facet in the mesh; and determining, based on the third geometric feature and the mapping, a ground-truth normal of the second facet.

19. A computer program product being tangibly stored on a non-transient machine-readable medium and comprising machine-executable instructions, the instructions, when executed on a device, causing the device to:

obtaining a noisy normal and a ground-truth normal of a first facet in a mesh;

determining, based on the noisy normal, a first geometric feature of the first facet from a plurality of neighboring facets of the first facet in the mesh; and determining, based on the first geometric feature and the ground-truth normal, a mapping from the first geometric feature to the ground-truth normal of the first facet for denoising the mesh.

20. The computer-readable storage medium of claim 19, wherein the computer-readable program instruction is further for executing:

obtaining a noisy normal of a second facet in the mesh;

determining, based on the noisy normal of the second facet, a third geometric feature of the second facet from a plurality of neighboring facets of the second facet in the mesh; and determining, based on the third geometric feature and the mapping, a ground-truth normal of the second facet.

* * * * *